Figure 1:
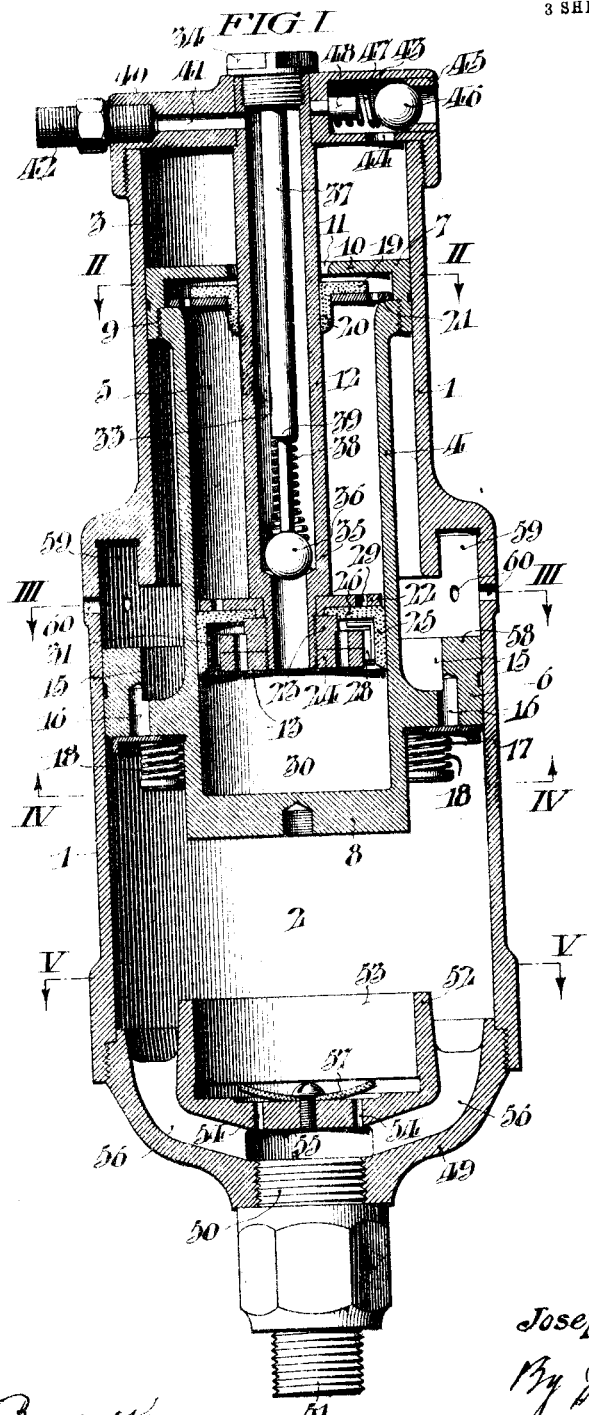

J. H. TEMPLIN.
PUMP FOR AUTOMOBILE TIRES.
APPLICATION FILED MAY 3, 1912.

1,087,201.

Patented Feb. 17, 1914.
3 SHEETS—SHEET 1.

Inventor
Joseph H Templin,

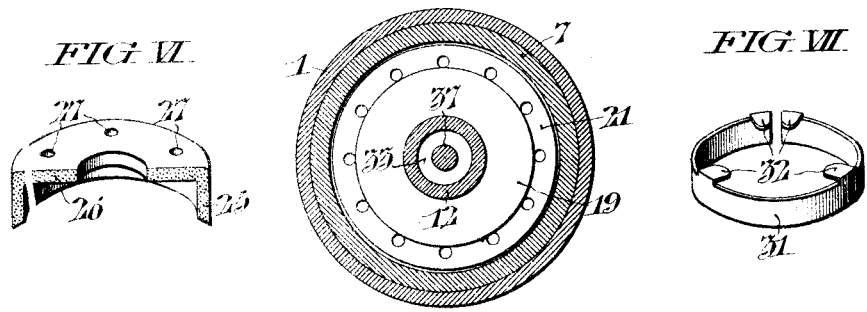
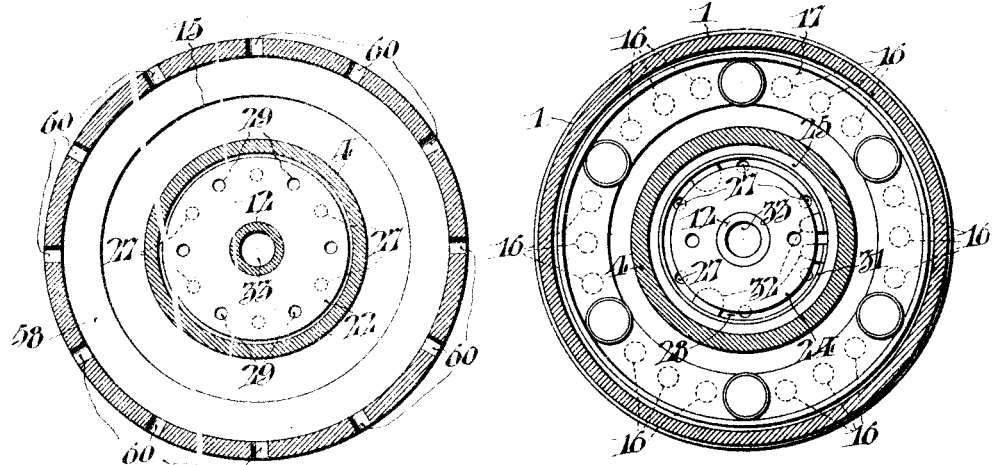
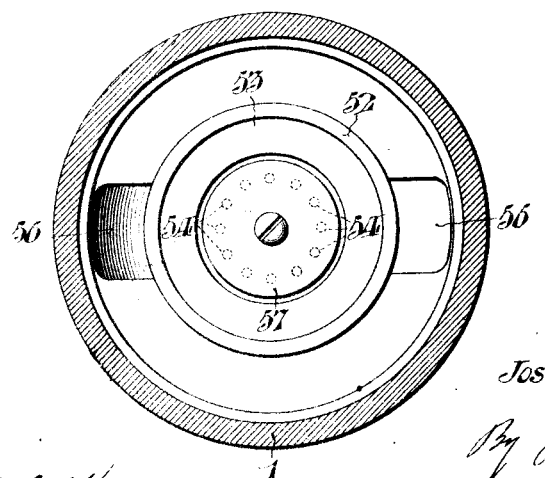

J. H. TEMPLIN.
PUMP FOR AUTOMOBILE TIRES.
APPLICATION FILED MAY 3, 1912.
1,087,201.
Patented Feb. 17, 1914.
3 SHEETS—SHEET 3.
FIG. VIII.
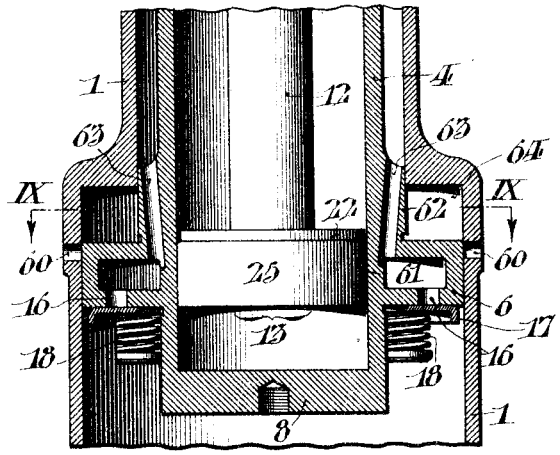
FIG. IX.
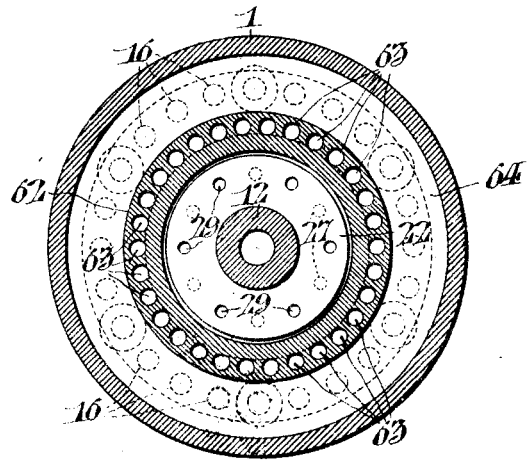
Witnesses
Inventor
Joseph H. Templin,
Attorneys

UNITED STATES PATENT OFFICE.

JOSEPH H. TEMPLIN, OF PHILADELPHIA, PENNSYLVANIA.

PUMP FOR AUTOMOBILE-TIRES.

1,087,201. Specification of Letters Patent. Patented Feb. 17, 1914.

Application filed May 3, 1912. Serial No. 694,960.

*To all whom it may concern:*

Be it known that I, JOSEPH H. TEMPLIN, of Philadelphia, in the county of Philadelphia and State of Pennsylvania, have invented certain new and useful Improvements in Pumps for Automobile-Tires, whereof the following is a specification, reference being had to the accompanying drawings.

The invention relates more particularly to a pump for inflating an automobile tire, which pump is operated through connection with one of the cylinders of a multiple cylinder internal combustion engine.

An object of the invention is to provide a pump of the above character wherein solely pure atmospheric air may be compressed and utilized for inflating an automobile tire.

A further object of the invention is to provide an automobile pump wherein the air taken from the atmosphere may be compressed in an auxiliary cylinder and subsequently delivered and further compressed in the automobile tire.

A still further object of the invention is to provide a pump wherein an auxiliary cylinder is located within the main cylinder and is provided with coöperating devices whereby said auxiliary cylinder is moved relative to the main cylinder from the compressed gases in the engine cylinder, and said auxiliary cylinder is utilized for drawing atmospheric air into the pump and for compressing and delivering the same to the automobile tire.

These and other objects will in part be obvious, and will in part be hereinafter more fully described.

In the drawings which show by way of illustration one embodiment of the invention, Figure I, is a vertical sectional view through a pump having my improvements applied thereto. Fig. II, is a transverse sectional view on the line II, II, of Fig. I. Fig. III, is a transverse sectional view on the line III, III, of Fig. I. Fig. IV, is a transverse sectional view on the line IV, IV, of Fig. I. Fig. V, is a transverse sectional view on the line V, V, of Fig. I. Fig. VI, is a detail partly in perspective and partly in section, showing one of the valves which coöperate with the auxiliary cylinder. Fig. VII, is a perspective view of the spring which assists in holding the circular plate valve in position. Fig. VIII, is a vertical sectional view of the central portion of the pump, showing a slightly modified form of the invention. Fig. IX, is a sectional view on the line IX, IX, of Fig. VIII.

My improved pump, as herein illustrated, consists broadly of an outer main cylinder which is adapted to be connected with one of the cylinders of a multiple cylinder internal combustion engine. This pump is preferably attached to the cylinder by removing the spark plug, although it may be otherwise attached. Reciprocating within the main cylinder is an auxiliary cylinder which carries a piston head at each end thereof. This auxiliary cylinder is moved relative to the main cylinder by the compression of the gases in the cylinder of the internal combustion engine, through the movement of the piston of said engine, the engine being operated by the remaining cylinders thereof, in the usual manner. This auxiliary cylinder draws in atmospheric air, which is transferred from the upper part of the main cylinder to the auxiliary cylinder where it is slightly compressed. The auxiliary cylinder is divided by a piston head carried by a stationary piston rod, and the air which is compressed in the auxiliary cylinder is transferred to and further compressed in the automobile tire, which is connected to the pump and to the auxiliary cylinder through the hollow, stationary piston rod.

Referring more in detail to the drawings, my pump consists of a main cylinder 1, which as herein shown, is formed with an inner lower chamber 2, and an inner upper chamber 3. The diameter of the lower chamber 2, is slightly greater than the diameter of the upper chamber 3. Mounted so as to freely reciprocate in the main cylinder, is an auxiliary cylinder 4. This auxiliary cylinder 4, is provided with an inner cylindrical chamber 5. The auxiliary cylinder 4, carries a piston head 6, which fits closely the inner cylindrical surface of the main cylinder. This piston head 6, is located at a point adjacent the lower end of the auxiliary cylinder. The auxiliary cylinder also carries a second piston head 7, which is located at the upper end of the auxiliary cylinder, and is so constructed as to fit closely the inner cylindrical wall of the upper portion of the main cylinder. The auxiliary cylinder is closed at its lower end as at 8, and the piston head 6, is preferably formed integral with the auxiliary cylinder. The piston head 7, consists of a ring which is threaded on to the upper end of the auxiliary cylinder as at 9, and said ring carries an inwardly projecting flange 10, which is formed with a central opening 11.

Located centrally of the main cylinder is a hollow stationary piston rod 12, which carries a piston head 13, at its lower end. This piston head 13, fits closely within the cylindrical inner surface of the auxiliary cylinder 4. The piston head 6, carried by the auxiliary cylinder is provided with an annular recess 15, and with a plurality of ports 16, which form a communication between the upper and lower faces of the piston head 6. These ports 16, are normally closed by a circular plate valve 17, which is held in place by springs 18, surrounding suitable headed studs and bearing against the plate. At the upper end of the auxiliary cylinder is a valve 19, which is preferably made of leather, and is provided with an extended collar 20, fitting snugly upon the hollow piston 12, but which slides freely thereon. This valve carries a perforated plate 21. The upper end of the cylinder is projected outwardly and is threaded to receive the piston head 7, as above noted. The piston head 7, is so constructed that the flange 10, thereof, is placed above the upper end of the auxiliary cylinder, and thereby a pocket is formed for the valve 19. The plate 21, is of such diameter as to rest on the outer end of the auxiliary cylinder.

As above noted, the flange 10, stops short of the central hollow piston and provides a space 11. This space is closed by the valve 19, which said valve rests against the flange 10. When however, the valve 19, rests against the upper end of the auxiliary cylinder, communication between the chamber in the upper end of the main cylinder and the chamber in the auxiliary cylinder, may be had through the annular space 11, and the ports in the metal disk 21. The piston head 13, at the lower end of the hollow piston rod, consists of a metal plate 22, which is held on the lower end of the piston rod by threaded rings 23, and 24. A leather cup piston head 25, consists of an outer ring which engages the inner cylindrical wall of the auxiliary cylinder and a flange 26. The inner edge of the flange 26, as herein shown, is clamped between the ring 23, and the plate 22. Said cup piston head is provided with a plurality of ports 27, (see Fig. VI.) The rings 23, and 24, are somewhat smaller diameter than the inner diameter of the ring of the cup piston, thus forming an annular space 28.

When the flange 26, of the cup piston is tight against the metal disk 22, the ports 29, in the metal disk will be closed. When however, said elastic cup piston is moved away from the metal disk 22, then communication between the upper and lower parts of the chamber of the auxiliary piston may be had, that is, the chamber 5, above the piston head 13 and the chamber 30 below the piston head, will communicate with each other through the ports 29, the ports 27, in the cup piston, and the annular space 28, between the rings 23, and 24, and the cup piston 25. In order to yieldingly hold the leather cup piston against the inner wall of the auxiliary cylinder, I have provided a spring 31, which is flat in cross section, and is bent so as to bear yieldingly against the inner wall of the ring of the cup piston. Said spring is shown in detail in Fig. VII, of the drawings. The upper edge of the spring is provided with inwardly bent lugs 32, which overlap the ring 23, and prevent the spring from becoming displaced.

The piston rod 12, as above noted, is hollow. The central passage 33, extends the full length of the piston rod, and is closed at its upper end by a threaded nut 34. The passage leads to the chamber 30, at the lower side of the stationary piston head in the auxiliary cylinder. Said passage 33, is slightly contracted adjacent its lower end so as to form shoulders 35, on which normally rests a ball valve 36. The threaded nut 34, carries a stem 37, which is smaller than the inner diameter of the passage 33, so that a free passage is afforded between the inner surface of the hollow piston and the stem 37. Said stem 37, at its lower end is reduced in diameter, and a coil spring 38, bears at one end against the shoulder 39, formed by said reduced portion, and at its other end against the ball 36, and normally holds the same on its seat. The reduced portion of the stem is slightly above the ball, when resting on its seat, and allows a limited movement of the ball from the seat.

The upper end of the main cylinder is closed by a cap 40. The hollow piston 12, is secured into the cap. Said cap is provided with a passage 41, which leads to the hollow piston. A threaded hollow nipple 42, serves as a means for connecting the lead pipe which conveys the air from the pump to the automobile tire. The cap 40, on the opposite side thereof is provided with a cylindrical recess 43, and an opening 44, which leads to the upper part of the main cylinder. An internal collar 45, is secured into the outer end of the recess 43, and this collar serves as a means for allowing the atmospheric air to pass through the opening or port 44, into the upper end of the cylinder. The opening leading to the outer air is closed by a ball 46, which seats against the collar 45. A spring 47, normally holds the ball on its seat. Said spring is supported by a stud 48, which also serves as a limiting stop for the ball 46.

The lower end of the main cylinder is closed by the head 49, which is threaded onto the cylinder and is provided with an opening which receives a threaded sleeve 50. The lower end of the threaded sleeve 50, is also threaded as at 51, and this threaded part 51, is adapted to be screwed into an opening in the cylinder of an internal combustion engine. The threaded portion 51, is preferably so constructed as to be screwed into the opening normally receiving the spark plug so that when it is desired to attach the pump to an engine, all that is necessary is to remove the spark plug and to screw the pump in the place therefor. This removing of the spark plug without other adjustments, prevents any chance of an explosion in the cylinder, to which the pump is connected, and said cylinder will serve merely as a compression cylinder for compressing the air or gas received into the same, which compressed air or gas will be carried through the threaded sleeve 50, into the main cylinder of the pump, where it may be utilized for actuating the auxiliary cylinder of the pump.

To prevent ramming of the auxiliary cylinder as it reciprocates in the main cylinder, I have provided the lower end of the auxiliary cylinder with a cylindrical part which projects below the piston head 6, carried by the auxiliary cylinder. The head 49, of the main cylinder, is also provided with a projecting part 52, which is formed with a cylindrical recess 53, adapted to receive the lower projecting end of the auxiliary cylinder. As the lower end of the cylinder passes into this recess or pocket 53, the air trapped thereby will serve as a cushion for the auxiliary cylinder. The bottom of the recess 53, is provided with ports 54, which lead to the space or passage 55, connected with the passage through the cylinder 50. This passage 55, is also connected by passages 56, with the main cylinder outside of the central projection 52. A disk valve 57, secured in the bottom of the recess 53, is adapted to close the ports 54, and prevent the passage of the air trapped in the pocket, through said ports. On the upward movement of the cylinder, the valve 57, will allow the air to pass through the ports 54, and engage the bottom of the auxiliary cylinder, and therefore, on the up stroke of the auxiliary cylinder, substantially the entire area of the piston head 6, and the end of the cylinder are subjected to the air compression in the cylinder of the engine. It will be obvious however, that from certain aspects of the invention, this valve 57, may be omitted. In order to form a cushion for the upward stroke of the auxiliary cylinder, which is of special value when the tire is under small compression, I have constructed the piston head 6, with an annular recess 15, which forms an annular ring 58, which is adapted to enter an annular recess or pocket 59, formed in the wall of the main cylinder. This ring 58, will trap the air in the annular recess 59, and thereby cushion the upward stroke of the auxiliary cylinder. In order to allow free egress of the air as the piston head 6, of the auxiliary cylinder moves upwardly, the walls of the cylinder are provided with ports 60, which are located adjacent the upper end of the enlarged portion of the cylinder. These ports are of sufficient number to prevent back pressure. The ports are however, disposed somewhat below the uppermost end of the enlarged part of the cylinder, so that the cushion above referred to may be formed for preventing the ramming of the auxiliary cylinder on its outward stroke.

In Figs. VIII, and IX, I have shown a slightly modified form of construction of cushion for the outer stroke of the auxiliary cylinder. The piston head 6, carried by the auxiliary cylinder 4, is cored, so as to provide a hollow central portion 61. The passages or ports 16, lead from the hollow center of the piston head to the lower face of the piston, and are closed by the circular plate valve 17, above referred to. The auxiliary cylinder is formed with an enlargement 62, which fits closely the inner wall of the upper cylindrical portion 3, of the main cylinder. Ports or passages 63, are formed in said enlargement, and connect the upper portion of the cylinder with the hollow central portion of the piston head 6. As the auxiliary cylinder moves upwardly, the ports 60, will be closed by the piston head and the enlarged part 62, of the auxiliary cylinder will move into engagement with the inner surface of the upper part of the main cylinder, and a certain amount of air will be trapped in the pocket 64. This trapping of the air will serve to cushion the upward movement of the auxiliary cylinder.

The operation of my device is as follows: Starting with the parts positioned as in Fig. I, and let it be supposed that the piston of the cylinder of the engine to which the pump is attached is on the suction stroke which will exhaust the air from the main chamber 2, of the pump. This exhausting of the air from the pump will cause the auxiliary cylinder to move downward and the lower end of the cylinder will enter the projecting portion 52, thus cushioning the down stroke of the cylinder. This downward movement of the auxiliary cylinder will cause pure air to be drawn from the atmosphere through the port 44, into the chamber 3, of the main cylinder. The ball check valve 46, will open to allow the air to rush in to fill the space produced on this down movement of the auxiliary cylinder. As the auxiliary cylinder moves downward, the valve 19, will be moved up against the flange 10, closing the passage 11, and any air contained in the chamber 5, of the auxiliary cylinder above the piston head 13, will be forced or transferred downwardly through the ports 29, into the chamber 30, beneath the piston head 13. On the out stroke of the piston of the engine, the air and gas in the engine cylinder will be compressed and forced through the passages 55, and 56, and also through the ports 54, into the main cylinder and against the lower face of the piston head 6. The plate valve 17, will seat and close the ports 16. This will cause the auxiliary cylinder to move outwardly or upwardly and the air in the chamber 3, will be compressed in the chamber 5, above the piston head 13. The valve 46, will close and the valve 19, will open to allow the air to be compressed in the auxiliary cylinder. On this same out stroke of the auxiliary cylinder, the air in the chamber 30, beneath the piston head 13, will be carried past the check valve 36, into the hollow piston, and through the passage 41, to the tire. When the auxiliary piston moves downwardly, it will readily be seen that air may pass from the ports 60, through the ports 16, in the piston head 6, and through the passages 56, to the cylinder of the gas engine, so that said cylinder may be filled with air.

From the above construction, it will be apparent that on the out stroke of the auxiliary cylinder, air which was drawn into the main cylinder will be compressed in the auxiliary cylinder, and the air which was previously compressed in the auxiliary cylinder and transferred below the piston head 13, will be further compressed and delivered to the automobile tire.

While I have shown the upper part of the main cylinder as of smaller diameter than the lower part of the main cylinder, it will be apparent that the cylinder may be of the same diameter throughout, as the active piston for compressing the air in the automobile tire is the piston 13, which has a relative movement in the auxiliary cylinder. The piston head 7, in the present pump serves to a certain extent, to compress the air in the chamber 5, but is mainly for the purpose of transferring the air from the upper side of the stationary piston 13, to the lower side thereof subsequent to the outward stroke of the auxiliary cylinder which compresses and forces the air into the tire. In other words, the two main piston heads of my pump are the piston heads 6, and 13, one of which is acted upon by the compressed gases in the engine cylinder, and the other of which acts upon the pure air taken from the atmosphere, and forces the same into the tire. These two pistons are not in any way connected, but have a movement relative to each other, and by this relative movement of the two pistons, together with the auxiliary cylinder, I am able to secure a more perfect supply of compressed pure air for the automobile tire. Further, by the intermediate piston head 7, carried by the auxiliary cylinder, I am able to compress the air in stages, that is to say, the air drawn into the chamber 3, is transferred and compressed in the chamber 5, and is subsequently transferred to the chamber 30, where it is finally compressed and delivered to the automobile tire.

It is obvious that minor changes in the details of construction and arrangement of parts may be made, without departing from the spirit of the invention as set forth in the appended claims.

Having thus described my invention, I claim:

1. A device for inflating automobile tires including in combination a main cylinder, means whereby said main cylinder may be attached to the cylinder of an internal combustion engine, an auxiliary cylinder located within said main cylinder, a piston head carried by the lower end of said cylinder and adapted to be impinged by the compressed gases of the engine cylinder, a hollow stationary piston rod, a piston head carried thereby and engaging the inner surface of the auxiliary cylinder, a piston head carried by the upper end of the auxiliary cylinder, and valves for controlling the air passing through the piston heads, whereby pure air may be drawn into the auxiliary cylinder, compressed, and delivered through the hollow piston to the tire.

2. A pump for inflating automobile tires including in combination a main cylinder, a hollow piston rod carried by said main cylinder and located centrally thereof, an auxiliary cylinder adapted to reciprocate in said main cylinder, a piston head located adjacent each end of the auxiliary cylinder and coöperating with the main cylinder, a piston head carried by the stationary piston rod and coöperating with the auxiliary cylinder, said stationary piston head having ports formed therein, and a valve for closing said ports on the out stroke of the auxiliary cylinder, said piston head at the upper end of the auxiliary cylinder having a port formed therethrough, and a valve for closing said port on the downward movement of the auxiliary cylinder, said main cylinder having a port at its upper end leading to the atmosphere, and a check valve for closing said port.

3. A pump for inflating automobile tires including in combination a main cylinder, a hollow piston rod carried by said main cylinder and located centrally thereof, an auxiliary cylinder adapted to reciprocate in said main cylinder, a piston head located adjacent each end of the auxiliary cylinder and coöperating with the main cylinder, a piston head carried by the stationary piston rod and coöperating with the auxiliary cylinder, said stationary piston head having ports formed therein and a valve for closing said ports on the out stroke of the auxiliary cylinder, said piston head at the upper end of the auxiliary cylinder having a port formed therethrough, a valve for closing said port on the downward movement of the auxiliary cylinder, said main cylinder having a port at its upper end leading to the atmosphere, a check valve for closing said port, means whereby the hollow piston may be connected to the tire, and a check valve for controlling the passage on the hollow piston.

4. A device for inflating automobile tires including in combination a main cylinder, means whereby said main cylinder may be attached to the cylinder of an internal combustion engine, an auxiliary cylinder located within said main cylinder, a piston head carried by the lower end of said cylinder and adapted to be impinged by the compressed gases of the engine cylinder, a hollow stationary piston rod, a piston head carried thereby and engaging the inner surface of the auxiliary cylinder, a piston head carried by the upper end of the auxiliary cylinder, and valves for controlling the air passing through the piston heads, whereby pure air may be drawn into the auxiliary cylinder, compressed, and delivered through the hollow piston to the tire, means whereby the outward stroke of the auxiliary cylinder is cushioned, and means whereby the inward stroke of said auxiliary cylinder is cushioned.

5. A pump for inflating automobile tires including in combination a main cylinder, having passages extending through the head at the lower end thereof, and devices for connecting said head to the cylinder of an internal combustion engine, an auxiliary cylinder adapted to reciprocate in said main cylinder, said auxiliary cylinder having a cylindrical projection at its lower end, said main cylinder having a projecting portion provided with a cylindrical recess adapted to receive the lower cylindrical end of the auxiliary cylinder, ports connecting the cylindrical recess with the passage leading to the engine cylinder, and a valve for closing said ports when the projection on the cylinder is moving into said recess, and means coöperating with the auxiliary cylinder for compressing pure air and delivering the same to a tire.

6. A pump for inflating automobile tires, including in combination an outer cylinder, a cap carried by the outer cylinder, a hollow piston rod mounted on said cap, a piston head carried by said hollow piston rod, a threaded nut for closing the outer end of the hollow piston rod, a stem carried thereby, a ball check valve for said piston rod, a spring interposed between said stem and said ball, said stem being positioned to limit the movement of the ball, an auxiliary cylinder coöperating with the stationary piston head and the main cylinder, and means whereby the movements of said auxiliary cylinder will draw in pure air, compress the same, and deliver said air to the tire.

In testimony whereof, I have hereunto signed my name at Philadelphia, Pennsylvania, this first day of May 1912.

JOSEPH H. TEMPLIN.

Witnesses:
 JAMES H. BELL,
 E. L. FULLERTON.